(12) United States Patent
Kim

(10) Patent No.: US 9,628,956 B1
(45) Date of Patent: Apr. 18, 2017

(54) METHOD AND SYSTEM FOR REPORTING AND MONITORING LOCATION-RELATED ACTIVITIES OF MOBILE DEVICES

(71) Applicant: BLUE NIGHT CO., LTD., Seoul (KR)

(72) Inventor: Jinyong Kim, Bucheon (KR)

(73) Assignee: BLUE NIGHT CO., LTD., Seoul (KR)

( * ) Notice: Subject to any disclaimer, the term of this patent is extended or adjusted under 35 U.S.C. 154(b) by 0 days.

(21) Appl. No.: 15/283,201

(22) Filed: Sep. 30, 2016

(30) Foreign Application Priority Data

Aug. 10, 2016 (WO) .................. PCT/IB2016/001231

(51) Int. Cl.
*H04W 4/02* (2009.01)
*G06Q 10/10* (2012.01)
*H04W 12/04* (2009.01)
*H04W 4/00* (2009.01)

(52) U.S. Cl.
CPC ........ *H04W 4/023* (2013.01); *G06Q 10/1091* (2013.01); *H04W 12/04* (2013.01); *H04W 4/001* (2013.01)

(58) Field of Classification Search
CPC ..... H04W 4/023; H04W 12/04; H04W 4/001; G06Q 10/1091
USPC ......................................... 455/418–420, 41.2
See application file for complete search history.

(56) References Cited

U.S. PATENT DOCUMENTS

| 7,957,725 B2 * | 6/2011 | Van Erlach | G06Q 30/0207 455/41.1 |
| 7,974,606 B2 * | 7/2011 | Lo | G06Q 20/4012 455/41.2 |
| 9,172,705 B1 * | 10/2015 | Kong | H04L 47/801 |
| 2016/0100311 A1 | 4/2016 | Kumar | |
| 2016/0156638 A1 | 6/2016 | Somani et al. | |
| 2016/0171451 A1 * | 6/2016 | Pugh | G06Q 10/1091 705/7.18 |
| 2016/0174022 A1 | 6/2016 | Nhu | |

FOREIGN PATENT DOCUMENTS

| CN | 104392501 A | 3/2015 |
| WO | 2015/061673 A1 | 4/2015 |

OTHER PUBLICATIONS

Bae et al., "Design and Implementation of Automatic Attendance Check System Using BLE Beacon", International Journal of Multimedia and Ubiquitous Engineering, 2015, vol. 10, No. 10, pp. 177-186.

* cited by examiner

*Primary Examiner* — Sharad Rampuria
(74) *Attorney, Agent, or Firm* — Knobbe Martens Olson & Bear LLP

(57) ABSTRACT

This application relates to reporting and monitoring a location of a mobile device. Disclosed is an attendance recording service in which when an employee requests attendance recording using a mobile application installed in a smartphone, the smartphone communicates with a server and records clock-in and clock-out of the employee. When the employee selects an attendance recording request button from the mobile application, an analysis is made as to whether the employee is positioned in a workplace, and clock-in or clock-out of the employee is recorded only when it is determined that the employee is positioned in the workplace, thereby maintaining reliable attendance recording.

30 Claims, 18 Drawing Sheets

Database - Workplaces

| Workplace ID | Manager contact | open hours | installed Beacon ID | working Employee ID |
|---|---|---|---|---|
| store 0987 | +1-777-555-5124 | 9am-5pm weekdays | C1:D2:A3:44:C1:44 | Staff 6454<br>Staff 6414 |
| store 1458 | +1-949-555-3968 | 1pm-5pm Saturdays | E1:D3:CC:EE:A1:D4 | Staff 7845 |
| store 9425 | +1-949-555-9874 | 11am-7pm weekdays | E1:D3:CC:EE:A1:D4 | Staff 7999 |

FIG. 9

Database - Employees

| Employee ID | Employee contact | Smartphone model | Smartphone OS | Smartphone hardware ID | registered workplace | working schedule |
|---|---|---|---|---|---|---|
| Staff 0413 | +1-640-555-1024 | iPhone 6 | iOS 9.3 | 14752224455557 | store 0987 | 9am-5pm weekdays |
| Staff 0188 | +1-404-555-1457 | Galaxy 5S | Android 4.5 | 01412488574522 | store 1458 | 9am-5pm weekdays |
| | | | | | store 9425 | 1pm-5pm Saturdays |
| Staff 2920 | +1-949-555-1457 | LG G5 | Android 5.0 | 21454165783545 | store 1475 | 11am-3pm weekends |

FIG. 10

Database - Beacons

| Beacon ID | installed workplace ID | Initialized / installed | battery replaced | beacon pin |
|---|---|---|---|---|
| C1:D2:A3:44:C1:44 | Store 5874 | 2014-07-11 | 2016-01-11 | 119811 |
| E1:D3:CC:EE:A1:D4 | Store 5874 | 2015-11-12 | N/A | 020208 |
| E1:D3:CC:EE:A1:D4 | Store 0413 | 2015-12-30 | N/A | 987114 |

FIG. 11

Database - Attendance Log

| Workplace ID | Employee ID | Clock-in Time | Clock-out Time | Clock-in Smartphone model ID | Clock-out Smartphone model ID | Clock-in Beacon ID | Clock-out Beacon ID |
|---|---|---|---|---|---|---|---|
| Store 4447 | Staff 0147 | 2016-07-25 08:44:55 | 2016-07-25 17:01:55 | iPhone 6 | iPhone 6 | 05893 | 05893 |
| Store 4447 | Staff 0147 | 2016-07-26 08:59:01 | 2016-07-26 16:59:01 | iPhone 6 | Galaxy S7 | 05893 | 05893 |
| Store 4447 | Staff 7412 | not reported | 2016-07-26 17:15:01 | Lumia 640 | Lumia 640 | 05893 | 05893 |
| Store 7845 | Staff 0478 | 2016-07-25 16:00:55 | 2016-07-25 21:10:55 | iPhone 6 | iPhone 6 | 99994 | 99994 |
| Store 4417 | Staff 0478 | 2016-07-28 19:55:10 | not reported | iPhone 6 | iPhone 6 | 14785 | 14785 |

FIG. 12

METHOD AND SYSTEM FOR REPORTING AND MONITORING LOCATION-RELATED ACTIVITIES OF MOBILE DEVICES

BACKGROUND

Field

The present application relates to reporting and monitoring a location of a mobile device.

Related Technology

There are various methods of confirming and recording attendance of employees in workplaces. Recently, workplace computers are used for reporting attendance of employees. Meanwhile, with advancement of wireless communication technologies, wireless devices such as smartphones can be used for confirming and recording the attendance.

SUMMARY

One aspect of the invention provides an attendance reporting system. The system comprises one or more of the following features:

- at least one beacon for installing at a designated facility for an attendance reporting service, a first one of the at least one beacon being installed at a first facility for the attendance reporting service, each beacon being configured to broadcast wireless signals such that the wireless signals can be received by at least one mobile terminal located within the facility where the beacon is installed, the wireless signals carrying one or more selected from the group consisting of a service ID, a hardware ID, a security code and a security key;
- the server ID being pre-assigned to and indicative of the attendance reporting service, the hardware ID being pre-assigned and specific to hardware of the first beacon, the security code being time-variant and generated by an algorithm included in the first beacon, and the security key being a key for the security code such that the same algorithm can generate the identical security code when using the security key.
- at least one database comprising data identifying facilities and users and further comprising hardware IDs of beacons such that, in the at least one database a first user working at a first facility is linked to the first facility and a first beacon installed in the first facility is linked to the first facility;
- a mobile application provided for installation on mobile terminals and for operation of the attendance reporting service, the mobile application being installed on a first mobile terminal; and
- a server comprising at least one computing device capable of accessing the at least one database and capable of communicating with mobile terminals.

The foregoing system includes one or more of the additional features as listed below:

- subsequent to authentication of the first user for reporting attendance via the mobile application installed on the first mobile terminal, the server is configured to find the first beacon in the at least one database using data identifying the first user available from authenticating the first user based on that in the at least one database the first beacon is linked to the first facility and the first facility is linked to the first user;
- in response to the first user's command for reporting attendance on the mobile application, the system is configured to cause processing of wireless signals received by the first mobile terminal to identify wireless signals broadcast by a beacon associated with the attendance reporting service and further to obtain the hardware ID, the security code and the security key contained in the identified wireless signals;
- subsequent to finding the first beacon in the at least one database and further subsequent to obtaining the hardware ID, the system is configured to determine if the obtained hardware ID is that of the first beacon found in the at least one database using the data identifying the first user;
- subsequent to obtaining the security code and the security key, the system is configured to determine if the obtained security code is the one expected from the first beacon using the obtained security key and an algorithm corresponding to the one included in the first beacon for generating the security code;
- the server is configured to record in the at least one database the first user's attendance at the first facility in response to the first user's command for reporting attendance when it is determined that the obtained hardware ID is that of the first beacon and further that the obtained security code is the one expected from the first beacon.

Another aspect of the invention provides a method of processing attendance reporting. The method comprises providing the foregoing attendance reporting system with or without one or more additional features. The method further includes one or more of the additional features as listed below:

- subsequent to installation of the first beacon at the first facility and further subsequent to installation of the mobile application on the first mobile terminal, authenticating, by the server, the first user for reporting attendance via the mobile application installed on the first mobile terminal;
- subsequent to authentication of the first user, finding the first beacon, the first facility or both in the at least one database using data identifying the first user available from authenticating the first user based on that in the at least one database the first beacon is linked to the first facility and the first facility is linked to the first user;
- in response to the first user's command for reporting attendance on the mobile application, causing to process wireless signals received by the first mobile terminal to identify the wireless signals broadcast by a beacon associated with the attendance reporting service and further to acquiring the hardware ID, the security code and the security key contained in the identified wireless signals;
- subsequent to finding the first beacon, the first facility or both in the at least one database and further subsequent to acquiring the hardware ID, determining if the acquired hardware ID is that of the first beacon found in the at least one database using the data identifying the first user;
- subsequent to acquiring the security code and the security key, determining if the acquired security code is the one expected from the first beacon using the acquired security key and an algorithm corresponding to the one included in the first beacon for generating the security code; and
- recording, in the at least one database, the first user's attendance at the first facility in response to the first user's command for reporting attendance when it is determined that the acquired hardware ID is that of the first beacon and further that the acquired security code is the one expected from the first beacon.

The foregoing system or method may further include one or more of the additional features that are defined in the claims such that the system or method may include two or more features that are defined in different claims.

BRIEF DESCRIPTION OF THE DRAWINGS

FIG. 9 is an example of workplace records in the database of FIG. 1.

FIG. 10 is an example of employee records in the database of FIG. 1.

FIG. 11 is an example of beacon records in the database of FIG. 1.

FIG. 12 is an example of attendance event records in the database of FIG. 1.

DETAILED DESCRIPTION OF EMBODIMENTS

Hereinafter, embodiments of the present invention will be described with reference to the drawings. These embodiments are provided for better understanding of the present invention, and the present invention is not limited only to the embodiments. Changes and modifications apparent from the embodiments still fall in the scope of the present invention. Some functions in the embodiments of the present invention can be implemented in the form of program instructions that can be executed in various computing devices and recorded in computer-readable recording media. The computer-readable recording media may include program instructions, data files, data structures and the like. Some of hardware devices used in the embodiments of the present invention can be implemented in software modules, and vice versa. Meanwhile, the claims constitute part of the detailed description of this application.

Attendance Recording Service Using Smartphone

This application discloses an attendance recording service, in which in response to an employee's request for attendance reporting using a mobile application installed in a smartphone, the smartphone communicates with a server and records clock-in and clock-out of the employee. When the employee selects an attendance recording request button on the mobile application, an analysis is made as to whether the employee is positioned in a workplace, and clock-in or clock-out of the employee is recorded if it is determined that the employee is at the workplace, thereby maintaining a reliable attendance record.

Confirming Position Using Beacon Signals

A wireless signal from a beacon installed in the workplace is used to determine whether an employee is at the workplace. When the attendance recording request button is selected on the mobile application, the smartphone acquires wireless signals from beacons located in the vicinity. By analyzing the acquired signals, determination may be made as to whether the employee is positioned at the workplace. The beacon's wireless signal reaches only a limited area around the beacon (e.g., 5 m to 15 m) and contains information identifying the workplace where the beacon is installed. Accordingly, as the smartphone analyzes the acquired beacon signal, confirmation may be made as to whether the signal is broadcast from the particular beacon installed in the workplace, and attendance is recorded only when it is confirmed that the acquired signal is off the particular beacon of the workplace.

Attendance Recording System

Figure 1:
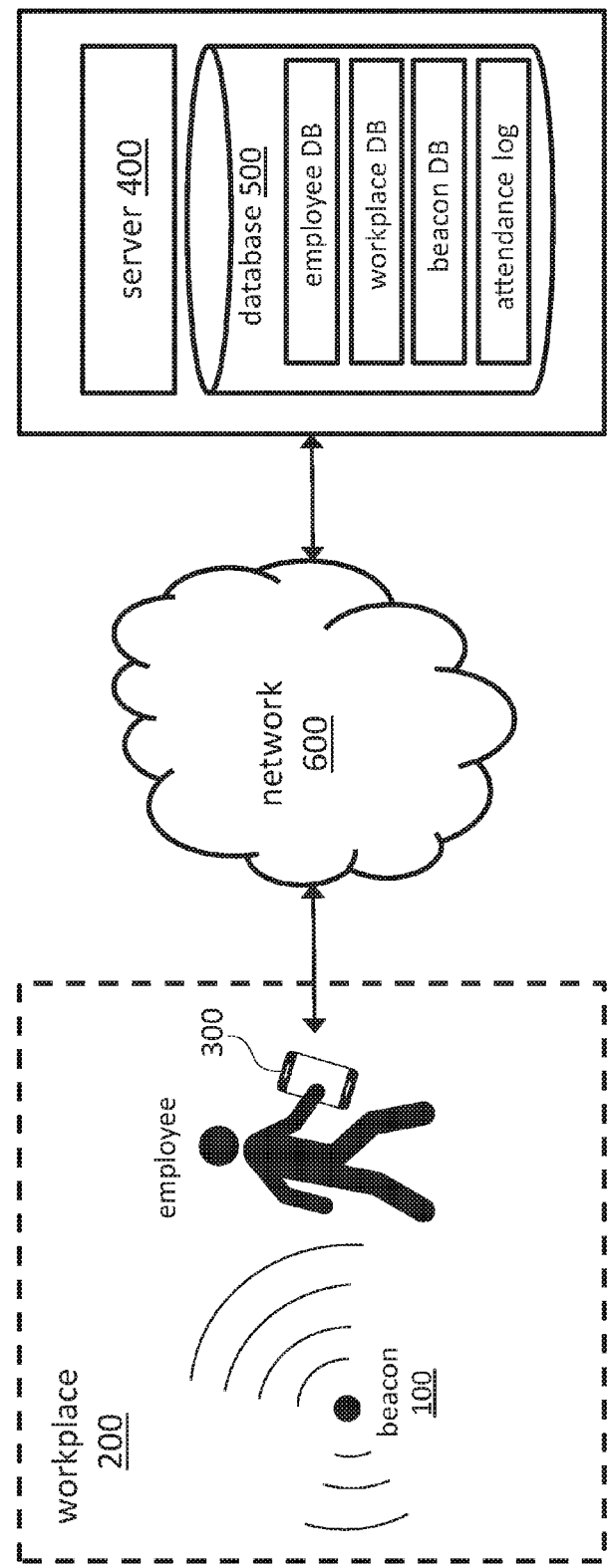
FIG. 1 illustrates an attendance recording system according to an embodiment of the present invention.

FIG. 1 illustrates an environment for implementing an attendance recording system according to an embodiment of the invention. A beacon 100 for broadcasting a wireless signal is installed at a workplace 200. An employee goes to the workplace 200 with a smartphone 300. The smartphone 300 may detect signals from the beacon and communicates with a server 400 through a network 600. A database 500 connected to the server stores information for identifying the employee, workplace and beacon and also stores an attendance event log.

Abuse

Figure 2:
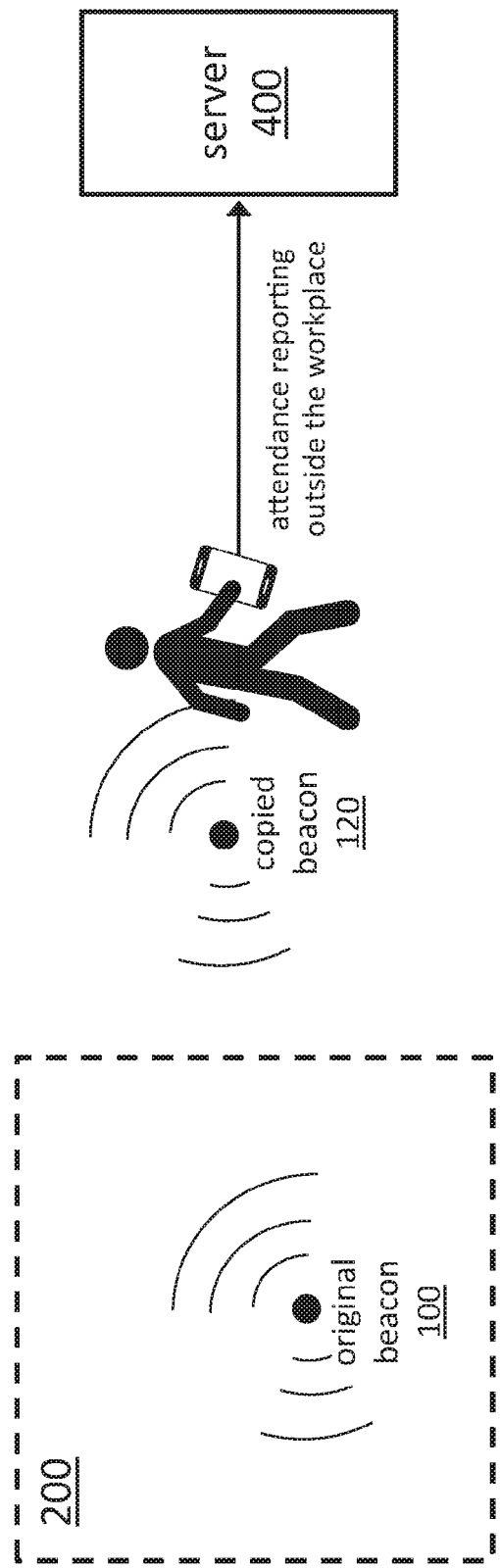
FIG. 2 illustrates an example of abuse using a copied beacon.
Figure 3:
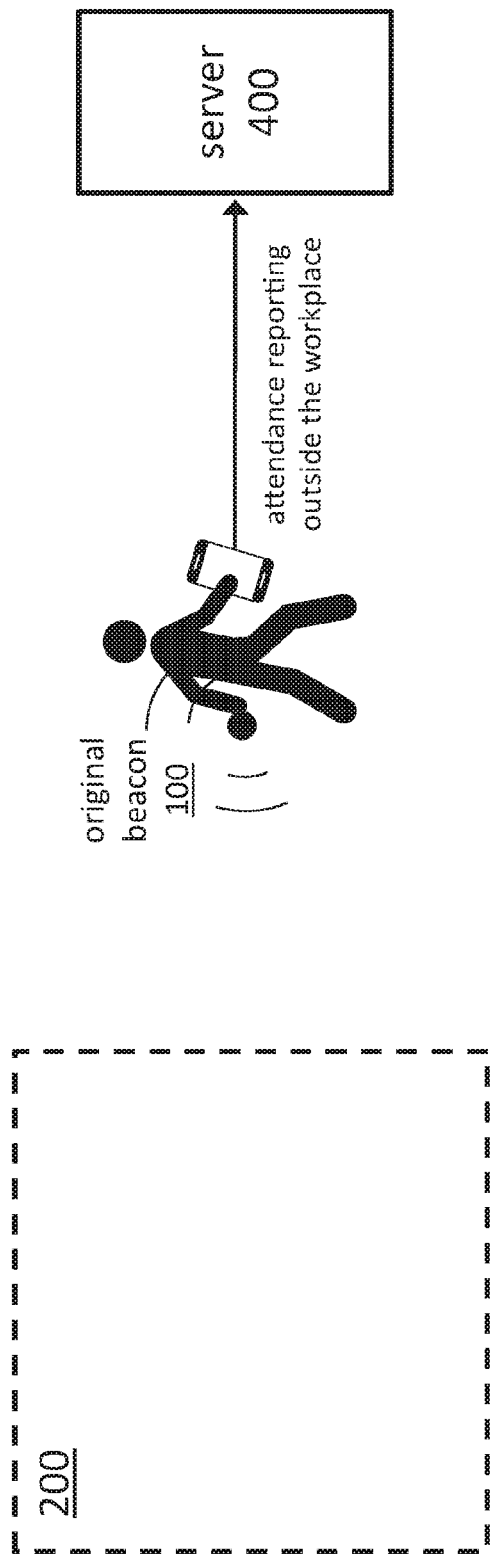
FIG. 3 illustrates another example of abuse using a workplace beacon outside workplace.

An attendance recording method using a wireless signal of a beacon may be vulnerable to certain abuses. First, one may replicate the workplace beacon. As shown in FIG. 2, using a signal from the copied beacon 120, attendance can be recorded even outside the workplace 200 where signals from the original beacon 100 is not available. Also, if a signal of the workplace beacon is copied and broadcast using another device, the same problem remains. As shown in FIG. 3, an employee may take the beacon 100 to outside the workplace 200 and attempt to report attendance there. According to an embodiment of the present invention, exemplified abuses may be addressed.

Attendance Recording System

Smartphone

In FIG. 1, the smartphone 300 is a mobile computing device capable of receiving and processing beacon signals and communicating with a server using a wireless communication network (a mobile phone network, a Wi-Fi network, etc.). In embodiments, the smartphone may include a position measurement module such as a GPS module. In embodiments, other mobile computing devices such as a tablet computer, a PDA, a notebook computer and the like capable of receiving and processing beacon signals and communicating with a server using a wireless communication network may replace the smartphone. In this application, the term smartphone is used to refer to mobile computing devices for convenience.

Mobile Application

In embodiments, a mobile application for using the attendance recording service is installed in the smartphone 300. The mobile application includes one or more software modules and implements the functions of the attendance recording service by controlling hardware of the smartphone. In some embodiments, the mobile application is software separately produced for the attendance recording service and downloadable through a mobile application store or the like. In other embodiments, other computer programs of a smartphone, such as a web browser, can be used instead of or together with the mobile application to implement functions of the attendance recording service.

Server

Figure 16:
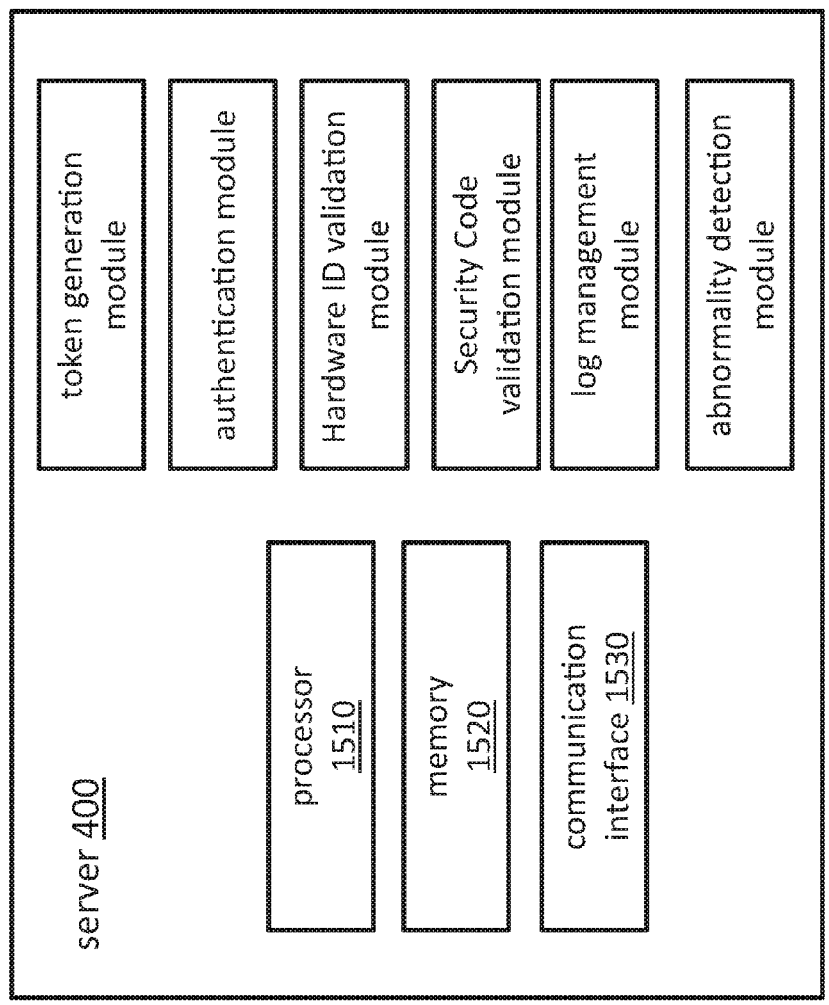
FIG. 16 illustrates components of the server of FIG. 1.

In embodiments as in FIGS. 1 and 16, the server 400 is formed with one or more networked computing devices. The computing device includes one or more processors, a memory and a communication interface for exchanging information with other devices. One or more software modules are installed in the server to implement functions of the attendance recording service while communicating with the smartphone.

Database

In embodiments as in FIGS. 1 and 9 to 12, the database 500 is implemented in one or more memory devices and stores workplaces registered for the attendance recording service, beacons installed in the workplaces, information about employees working at the workplaces and logs of attendance events. The workplaces, beacons, employees and logs of attendance events may be stored in separate database modules.

Network

In embodiments as in FIG. 1, the network 600 is a communication network for connecting the smartphone 300 and server 400, and includes wired and wireless communication connections. For example, the network 600 may include all or some of a mobile phone network, a Wi-Fi network, an Internet and an Intranet.

Workplace

In embodiments as in FIG. 1, the workplace is a place in which employees work, such as an office, a store, a factory or the like, and refers to a place in which one or more beacons are installed so that the employees may receive beacon signals using a smartphone. In some embodiments, the workplace refers to a location or space (e.g., a door, a passage, a locker room and the like) within the office, store or factory that is designated for employees to stop by for receiving beacon signals to report attendance.

Beacon

In embodiment as in FIG. 1, the beacon 100 is a device for broadcasting a wireless signal based on a wireless communication protocol such as Bluetooth. In embodiments, wireless communication protocols other than Bluetooth (e.g., Near Field Communication) may also be applicable to the beacon. In embodiments, the beacon 100 includes a processor, a memory and a broadcasting module. The processor, the memory and broadcasting module may be implemented with a microcontroller unit (MCU). In an embodiment, the beacon maintains time information using a clock or a counter included therein.

Beacon does not Communicate with Server Two Way

In embodiments, the beacon is a low-power broadcasting device operating with battery power, without a separate power supply thereto. When a beacon is assigned to a workplace and initialized, the beacon continuously or periodically broadcasts preprogrammed wireless signals. In embodiments, the beacon's signal strength is set such that a device such as a smartphone may detect within the workplace only. Accordingly, the signal from the beacon does not arrive at a server installed at a place other than the workplace. In embodiments, the beacon does not perform two-way communication with the server and does not have a communication module needed for such two-way communication with the server.

Beacon Signals

The wireless signal from the beacon carries one or more of a service ID for the attendance recording service, a hardware ID of the beacon, a security code, a key for the security code. In some embodiments, the beacon signal carries all of the service ID, the hardware ID, the security code and the key for the security code. In some embodiments, the beacon signal carries the service ID, the hardware ID and the security code and does not include the key for the security code. In some embodiments, the beacon signal carries the service ID and the hardware ID, and does not include a security code or a key for the security code. In some embodiments, the beacon signal may further include additional information or data. Each of the data carried by the beacon signal may be loaded in different fields of a beacon signal format, or two or more data may be loaded in a single field. In some embodiments, the beacon signal is configured in a format conforming to the iBeacon Specification and includes a Universally Unique IDentifier (UUID) field, a Major field, a Minor field and a Parity field.

Attendance Recording Service ID

The attendance recording service ID is used to identifying beacon wireless signals for the attendance recording service from other wireless signals. When the smartphone receives a plurality of beacon signals, the mobile application process to select only beacon signals having the service ID that is known to the mobile application. In some embodiments, all beacons for the same attendance recording service transmit the same service ID even if they are installed in different workplaces. In some embodiments, only some beacons for the same service transmit the same service ID while other beacons transmit a different service ID. In an embodiment, the service ID does not change over time while the beacon operates. In an embodiment, the service ID is stored in the memory of the beacon, and once the beacon is installed in a workplace, it is maintained unless the hardware ID of the beacon is updated using a PIN.

Hardware ID

The hardware ID is an identifier unique to the hardware of a particular beacon. For example, a MAC address assigned to a network interface of the beacon is used as the hardware ID of the beacon (see FIG. 11). In an embodiment, a randomly generated unique identifier is assigned to each beacon and used as a hardware ID of the beacon. In an embodiment, the hardware ID does not change over time while the beacon operates. In an embodiment, the hardware ID is stored in the memory of the beacon.

Security Code

The security code is to prevent abuse of replicating the beacon or its signal. In embodiments, the security code changes over time. As in FIG. 3, the security code is periodically and repetitively updated for transmission. The interval for updating the security codes may be one minute, ten minutes, thirty minutes, one hour, eight hours, twenty-four hours, five days and seven days. The security code is valid for the period of update interval. In some embodiments, the security code changes according to other parameters in addition to the time. Here, other parameters are, for example, the hardware ID, the workplace's name, workplace's address, and the workplace's employer. In an embodiment, the beacon has an algorithm, a logic, software or the like for generating a security code. For example, a Time-based One-time Password Algorithm (TOTP) may be included in the beacon.

Security Key

A key of a security code is data from which the security code can be obtained using the same algorithm as used for generating the security code. In some embodiments, the server 400 has the same algorithm as the beacon used for generating a security code. When a key is transmitted to the server via the smartphone, the server computes a security code using the transmitted key, and the computed security code is compared with a security code obtained from a beacon signal. In some embodiments, the key is a time when the security code is generated at the beacon or a time representing a time frame (update interval) during which the security code is valid. In another embodiment, the key is a modification of a time and can be calculated back to the time. In another embodiment, if the beacon is synchronized with the smartphone or the server, the security code can be generated using the time of the smartphone or the server when the time of the beacon is not available from a beacon signal. In this case, for example, a time when the employee pressed the attendance recording request button, a time when the beacon signal is obtained at the smartphone, a time when the server receives the security code can be used to generate the security code without referring to a key in the beacon signal. In an embodiment, the key contained in the beacon signal does not include all parameters for generating the security code, and some parameters for generating the security code (e.g., a current time of the server or the smartphone, an employee ID, an address of the workplace and the like) which are not contained in the beacon signal and can be obtained from other information sources (the database or the like).

Process of Attendance Recording Service

Figure 4:
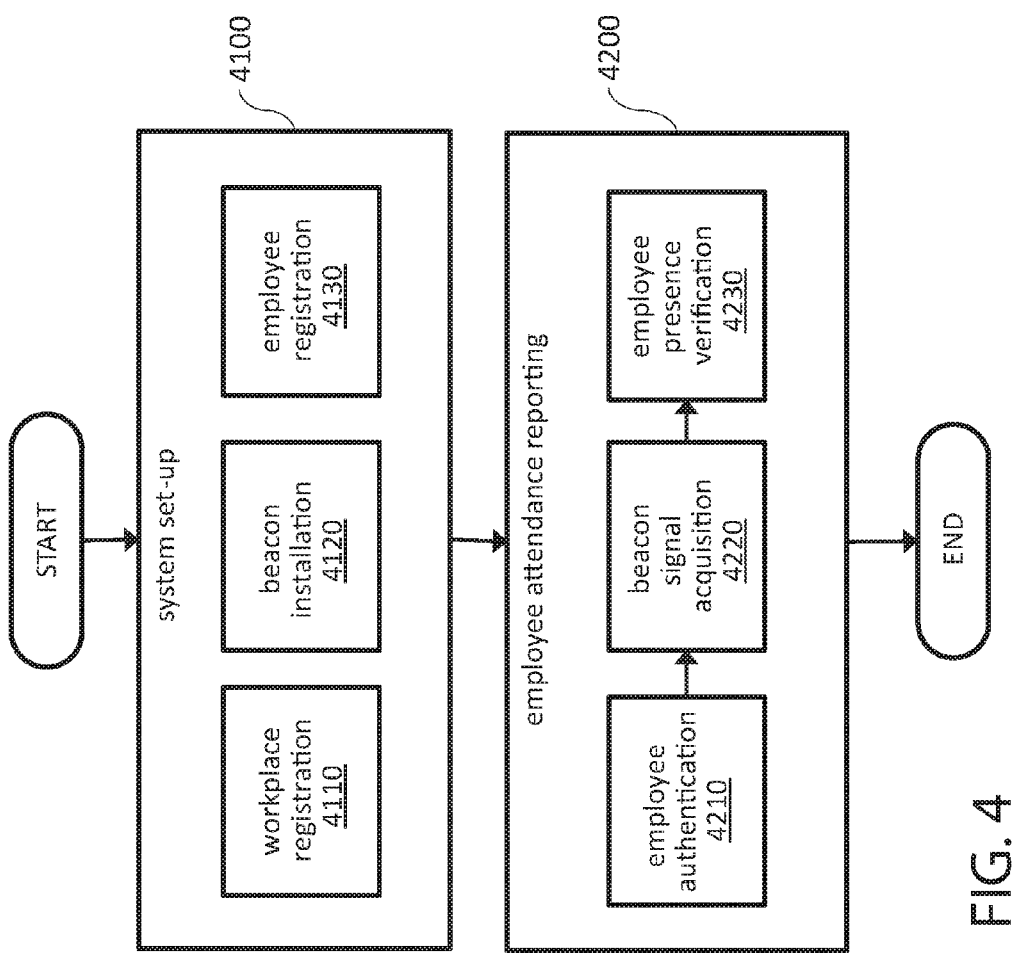
FIG. 4 is a flowchart of an attendance recording method using the system of FIG. 1.

A setup process (4100) of the attendance recording system is performed prior to recording attendance using a smartphone. Referring to FIG. 4, setup of the attendance recording system includes registering a workplace (4110), installing a beacon in the registered workplace (4120), and registering an employee working at the workplace (4130). After the setup process is completed, when an employee signs in the attendance recording service using a mobile application of the smartphone 300, the server authenticates the employee (4210). Subsequently, when the smartphone receives signals of a nearby beacon (4220), the employee's presence in the workplace is verified based on analysis of the received signals of the beacon (4230).

Process of Attendance Recording Service

Sign-Up of Employer (5100, 5110)

Figure 5:
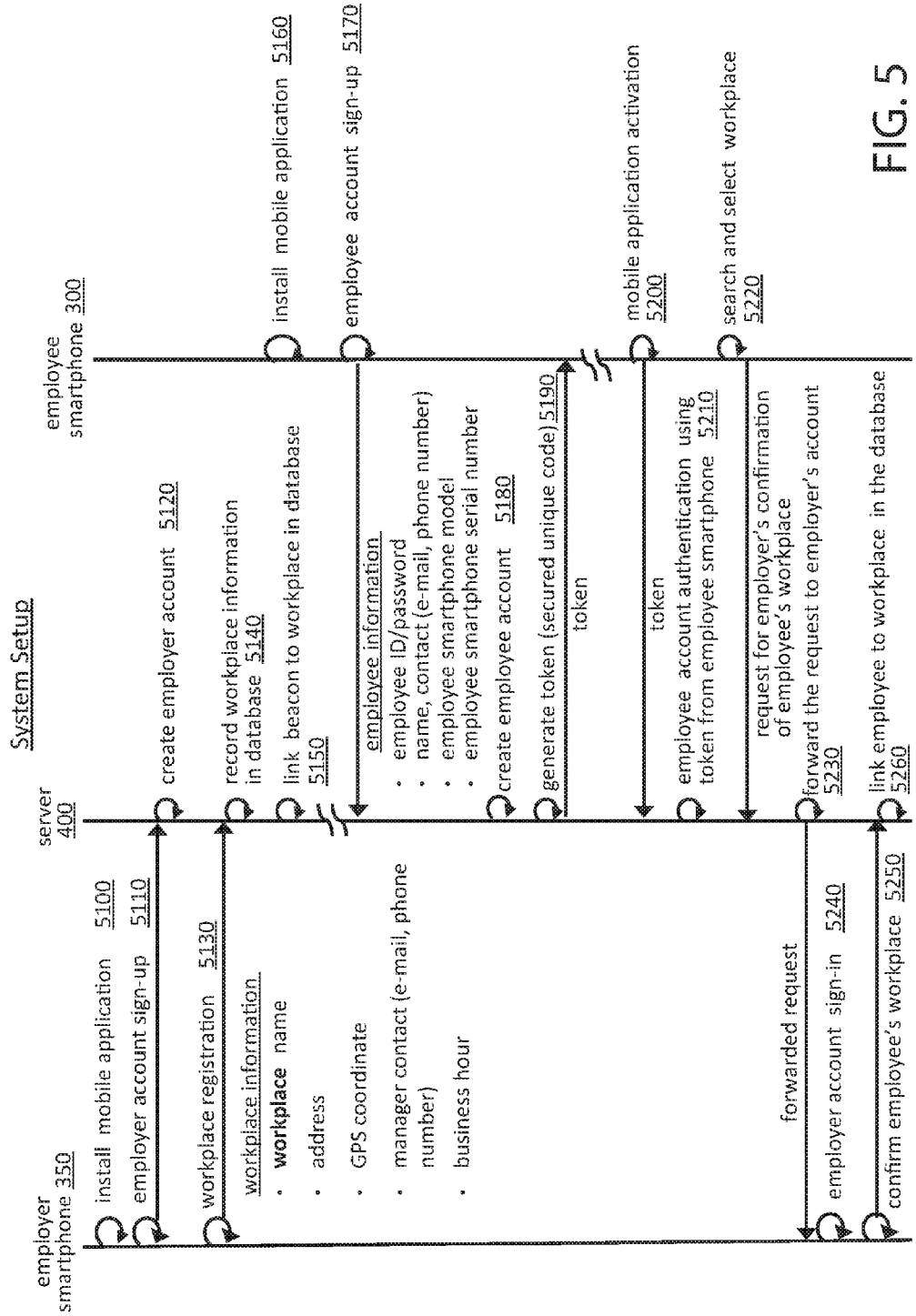
FIG. 5 illustrates a setup process of the attendance recording system in the method of FIG. 4.

Referring to FIGS. 4 and 5, in embodiments, an employer operating a workplace signs up the attendance recording service (5110). The server records information (e.g., a name, contact information, an address) of the employer in the database and creates an account of the employer (5120). The sign-up of the employer is performed using a mobile application after installing the mobile application (5100) on the employer smartphone 350.

Registration of Employer's Workplace (5130, 5140)

Referring to FIGS. 4 and 5, in embodiments, the employer subscribing the attendance recording service provides to the server 400 information of a workplace that the employer operates and registers the workplace in the database 500. In an embodiment, the information of the workplace provided to the server includes at least one of a name, an address, GPS coordinates, contact information of a manager and business hours of the workplace. In an embodiment, the server 400 links the workplace and the employer in the database 500.

Assign Beacon to Workplace (5150)

Referring to FIGS. 4 and 5, in embodiments, at least one beacon is assigned to each of the workplaces registered in the database. In embodiments, beacons assigned to the workplace are linked to the workplace in the database 500. In embodiments, the beacon is initialized before installing it in the workplace to which the beacon is assigned.

Initialization and Installation of Beacon

Figure 6:
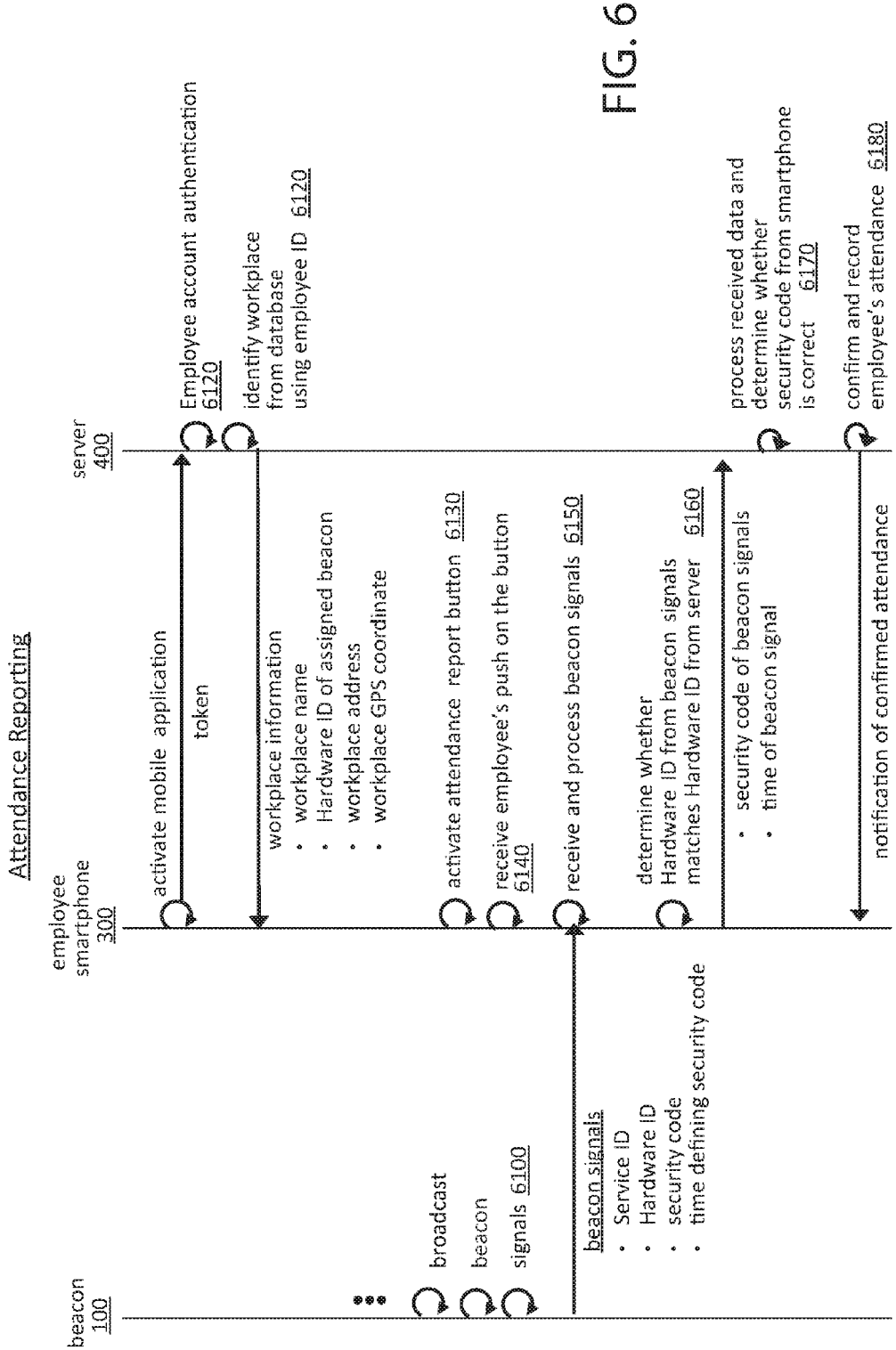
FIG. 6 illustrates a process of recording attendance of an employee in the method of FIG. 4.
Figure 7:
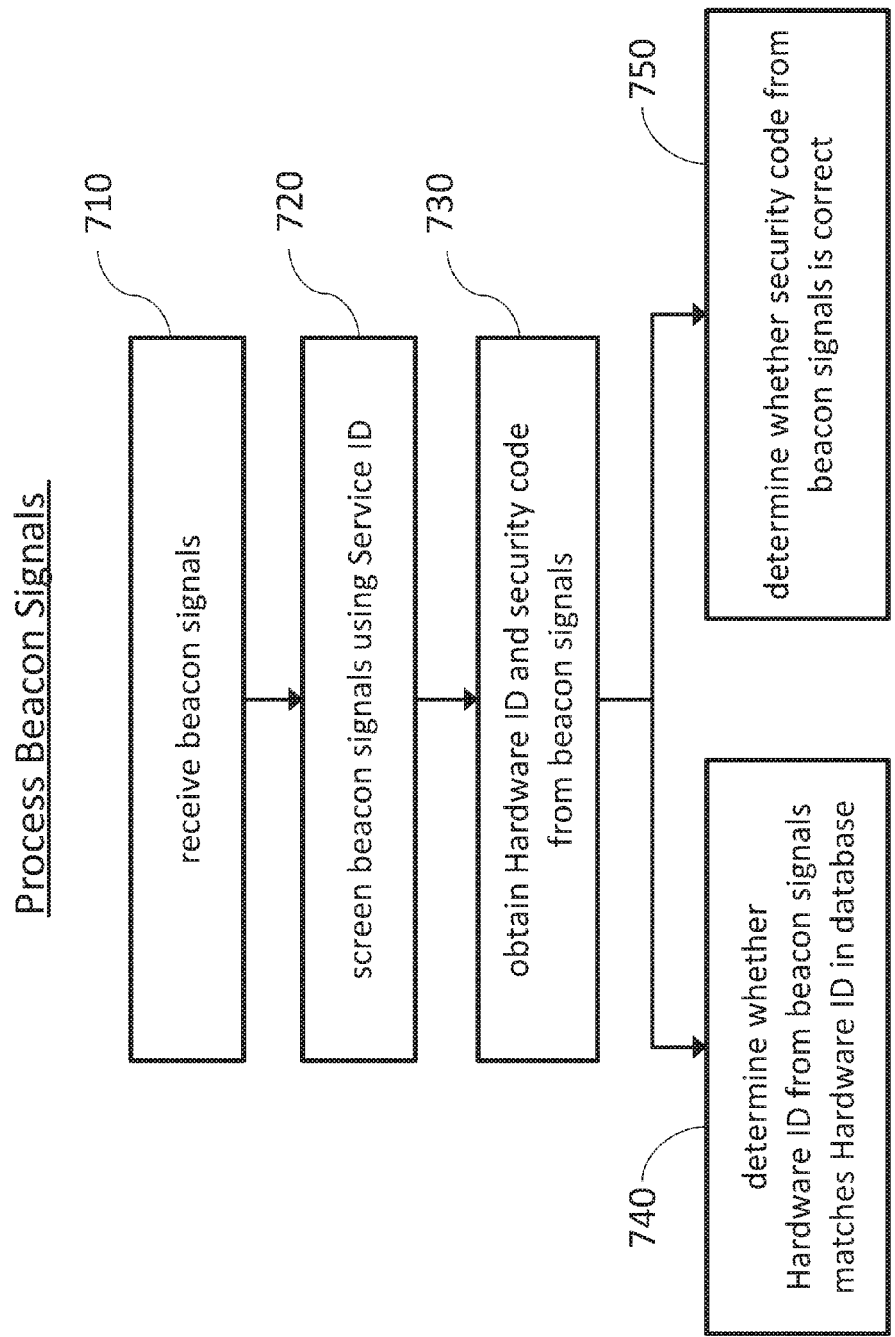
FIG. 7 is a flowchart of processing a beacon signal in an embodiment of the present invention.

In embodiments, the beacon is programmed to broadcast wireless signals. In the embodiments of FIGS. 5 and 6, signals broadcast by the beacon includes an attendance recording service ID, a beacon hardware ID, a security code and a key of the security code. In beacon initialization, time of the beacon may be synchronized with the server. The beacon is installed in a workplace and broadcasts wireless signals continuously or periodically (6100).

Employee Sign-Up (5160)

Referring to FIG. 5, in the embodiments, an employee working at the workplace registered by the employer installs the mobile application in the smartphone 300 (5160) and signs up the attendance recording service (5170). The server 400 receives information of the employee and registers an account of the employee by recording the information of the employee in the database 500 (5180). In an embodiment, the information on the employee provided to the server includes at least one of a name and a contact (an e-mail address and a phone number) of the employee, and a model name of the smartphone and a serial number of the smartphone.

Registration of Employee's Workplace (5220, 5230, 5240, 5250, 5260)

Referring to FIG. 5, in the embodiments, the employee searches for workplaces using the smartphone and selects the workplace where the employee works (5220). If the employee inputs (selects) the workplace where the employee works, a request to confirm the employee's workplace is transmitted from the smartphone to the server. The server 400 places a request to confirm the employee's workplace to the account of the employer (5230). If the employer signs in (5240) and confirms the employee's workplace (5260), the server 400 links the employee and the workplace in the database 500. In an embodiment, a working schedule of the employee is recorded in the database 500 as well, based on the employer's confirmation (approval).

Token Genration and Employee Authentication (5180, 5190, 5200, 5210)

Referring to FIG. 5, in the embodiments, if the employee signs in using his/her ID and password at the mobile application, the server generates a token corresponding to a combination of the ID and password (5180) and sends the token to the mobile application of the smartphone. The token generated by the server and transferred to the smartphone is a secured unique identification code for identifying the employee signed in using the ID and the password. Accordingly, an identifier of the employee can be derived from the token. The mobile application stores the received token in the memory of the smartphone. If the mobile application is deactivated (terminated or put into standby) and then activated (executed) while the employee does not sign out, the token stored in the memory of the smartphone is transmitted to the server. The server 400 performs authentication on the employee's account using the received token (5210, 6120).

Providing Identifier of Assigned Beacon to Smartphone (6120)

In an embodiment, the server 400 performs authentication for the employee using the token received from the smartphone 300. In another embodiment, alternatively to or together with the token, other identifiers (the employee's ID for the attendance recording service, or an identifier of the employee' smartphone) can be used to authenticate the employee. Referring to FIG. 6, immediately after the authentication for the employee is completed, without a delay, the server 400 identifies a workplace linked to the employee, and a beacon linked to the workplace from the database 500 (see FIGS. 9 to 12), transmits to the smartphone the hardware ID of the beacon installed in the employee's workplace. In an embodiment, the smartphone stores the hardware ID provided by the server in its local memory. In an embodiment, in addition to the hardware ID of the beacon assigned to the workplace, information on the workplace including at least one of a name, an address, GPS coordinates and business hours of the workplace is provided to the smartphone.

Activation of Attendance Recording Request Button, Receiving Employee Input (6130, 6140)

In the embodiments of FIG. 6, after the authentication of the employee's account is completed, the mobile application of the smartphone activates (displays or emphasizes) the attendance recording request button (an icon on the screen) and waits for an input of the employee. In an embodiment, along with the attendance recording request button, the smartphone 300 also provides information of the workplace for which the employee's attendance will be recorded based on selection of the attendance recording request button. In an embodiment, the information of the workplace for which attendance will be recorded is identified by the server 400 from the database 500 using the employee's identification that the server 400 provided to the smartphone 300 prior to activation of the attendance recording request button. If an input of the employee for the attendance recording request button is received (6140), the smartphone stores a time of the employee's input on the attendance recording request button and collects signals of nearby beacons.

Acquisition and Processing of Beacon Signals (6150)

Referring to FIG. 6, in the embodiments, the smartphone collects beacon signals using its wireless communication module. The smartphone 300 acquires, from the beacon signals, a hardware ID of the beacon, a security code and a key of the security code. In an embodiment, the smartphone referring to the service ID of the beacon signals (e.g., a UUID of the iBeacon specification) may selectively process only the beacon signals having a service ID of the attendance recording service. In some embodiments, the smartphone collects beacon signals only for a predetermined duration (e.g., one second, three seconds, twenty seconds, one minute, five minutes or the like) after the attendance recording request button is selected by the employee.

Verifying Match of Hardware ID (6160)

In the embodiments of FIG. 6, subsequent to the authentication of the employee's account, the smartphone 300 determines whether the hardware ID acquired from the beacon signals matches the hardware ID (identified by the server from the database using the employee's identification) received from the server.

Verifying Match of Security Code (6160, 6170)

In the embodiments of FIG. 6, the smartphone 300 transmits the security code and the key of the security code obtained from the beacon signals to the server 400. In an embodiment, the key is the time used for generating the security code at the beacon. The server 400 generates a security code using the same algorithm as the beacon used for generating the security code. The server 400 determines whether the security code obtained from the beacon signals matches the security code generated by the server. In an embodiment, the server 400 receives a hardware ID and a time contained in the beacon signals from the smartphone, and uses them to generate a security code.

Recording Employee's Attendance (6180)

In the embodiments of FIG. 6, if (1) the hardware ID obtained from the beacon signals by the smartphone matches the hardware ID identified from the database using the employee's identification and (2) the security code obtained from the beacon signals matches the security code generated by the server, the server 400 determines that the employee has requested attendance reporting at the employee's workplace and records the employee's attendance in the database.

Two or More Workplaces of Employee

In some embodiments, if two or more workplaces are linked to the employee in the database 500, the server 400 transfers hardware IDs of all the beacons assigned to the two or more workplaces to the smartphone 300. In another embodiment, the server selectively provides a subset of hardware IDs of the beacons.

Server Determines Expected Workplaces and Transmits Related Information

In some embodiments, if the authentication is completed, the server 400 identifies one or more workplaces where the employee is expected to report his/her attendance by comparing a working schedule of the employee recorded in the database 500 with a current time. The server 400 provides, to the smartphone, information linked to the expected workplaces (names of the workplaces, addresses, GPS coordinates, hardware IDs of beacons installed in the expected workplaces and the like) in the database 500. For example, assuming that a employee works at workplace A from 9 a.m. to 5 p.m. on weekdays and works at workplace B from 1 p.m. to 6 p.m. on Saturday, and that the employee activates the mobile application at 8 a.m. on Monday, the server identifies workplace A having the most close working schedule to the current time as an expected workplace of attendance reporting, and transmits hardware IDs of the beacons installed in the workplace A to the smartphone while not transmitting hardware IDs of the beacons installed in the workplace B to the smartphone.

Process of Attendance Recording Service

Acquiring Beacon Dignals (710)

Referring to FIG. 6, in embodiments, the smartphone collects signals from nearby beacons immediately after the employee presses the attendance recording request button. In other embodiments, the smartphone continuously or periodically scans beacon signals regardless of selection of the attendance recording request button. For example, the mobile application running in the background scans beacon signals and records the detected beacon signals even while the mobile application is not displayed on a screen of the smartphone.

Screening of Beacon Signals (720)

In some embodiments, when multiple beacon signals are available at the same time, the smartphone 300 selectively acquires and processes a subset of the multiple beacon signals. For example, the smartphone verifies whether the service ID of the sensed beacon signal is identical to at least one of service IDs registered in the database. To this end, the server provides the smartphone with the service IDs registered in the database before the smartphone acquires the beacon signals.

Selective Processing of Multiple Beacon Signals Available

The smartphone has information regarding what is the service ID applied to the beacons for implementing the attendance recording service. When several beacon signals are sensed at the smartphone, beacon signals having a service ID different from service IDs known to the smartphone are ignored, and they are not used for attendance recording for the employee. For such selective processing, the beacon's service ID for employee attendance recording was stored in the memory of the smartphone prior to obtaining the beacon signals (710). In an embodiment, the server provides the smartphone with the service ID of the beacon of the employee's workplace, or all service IDs on the database.

Acquiring Hardware ID and Security Code from Beacon Signal (730)

In an embodiments of FIG. 6, the smartphone obtains the hardware ID, the security code and the key of the security code from the beacon signals. In other embodiments, the smartphone 300 forwards the beacon signals to the server 400 and the server 400 acquires the hardware ID, the security code and the key for the security code from the forwarded beacon signals.

Verifying Hardware ID of Beacon Signal (740)

Referring to FIG. 6, in embodiments, verification of matching between the hardware ID of the beacon signals and the hardware ID identified from the database (6160 of FIG. 6) is performed at the smartphone. In other embodiments, verification of matching between the hardware IDs can be performed in the server 400. In such cases, before the server performs verification of matching between the hardware IDs, the smartphone provides the server 400 with the beacon signals obtained at the smartphone or the hardware ID obtained from the beacon signals. In an embodiment, when the hardware ID obtained from the beacon signals matches the hardware ID identified from the database based on the employee's identification, it is determined that the beacon broadcast the beacon signals is a valid (original) one.

Verification of Hardware ID—Limited Comparison with Beacons of Employee Workplace In the hardware ID verification (6160) of FIG. 6, the hardware ID acquired from the beacon signals at the smartphone is compared with the hardware ID of the beacon installed in the authenticated employee's workplace, rather than with all beacon hardware IDs stored in the database 500. When the hardware ID obtained from the beacon signals is compared with limited numbers of target hardware IDs selected based on the identifier of the employee, faster verification is possible. In some embodiments, when a working schedule of the employee is considered additionally, among the beacons of the workplace linked to the employee, the numbers of target hardware IDs to be considered for the hardware ID verification can be further reduced.

Verification of Security Code (750)

In the embodiments of FIG. 6, verifying match of beacon security code (6170) is performed at the server 400. In other embodiments, the security code match verification (6170) can be performed at the smartphone rather than the server 400. In such cases, the smartphone has the same algorithm, logic, software or the like as the beacon used for security code generation, and generates a security code using a key obtained from a beacon signal using the algorithm. In an embodiment, when the security code acquired from the beacon signals matches the security code generated by the server or smartphone, it is determined that the beacon broadcast the beacon signals is a valid one (original).

Process of Attendance Recording Service—Using Location of Smartphone

Figure 8:
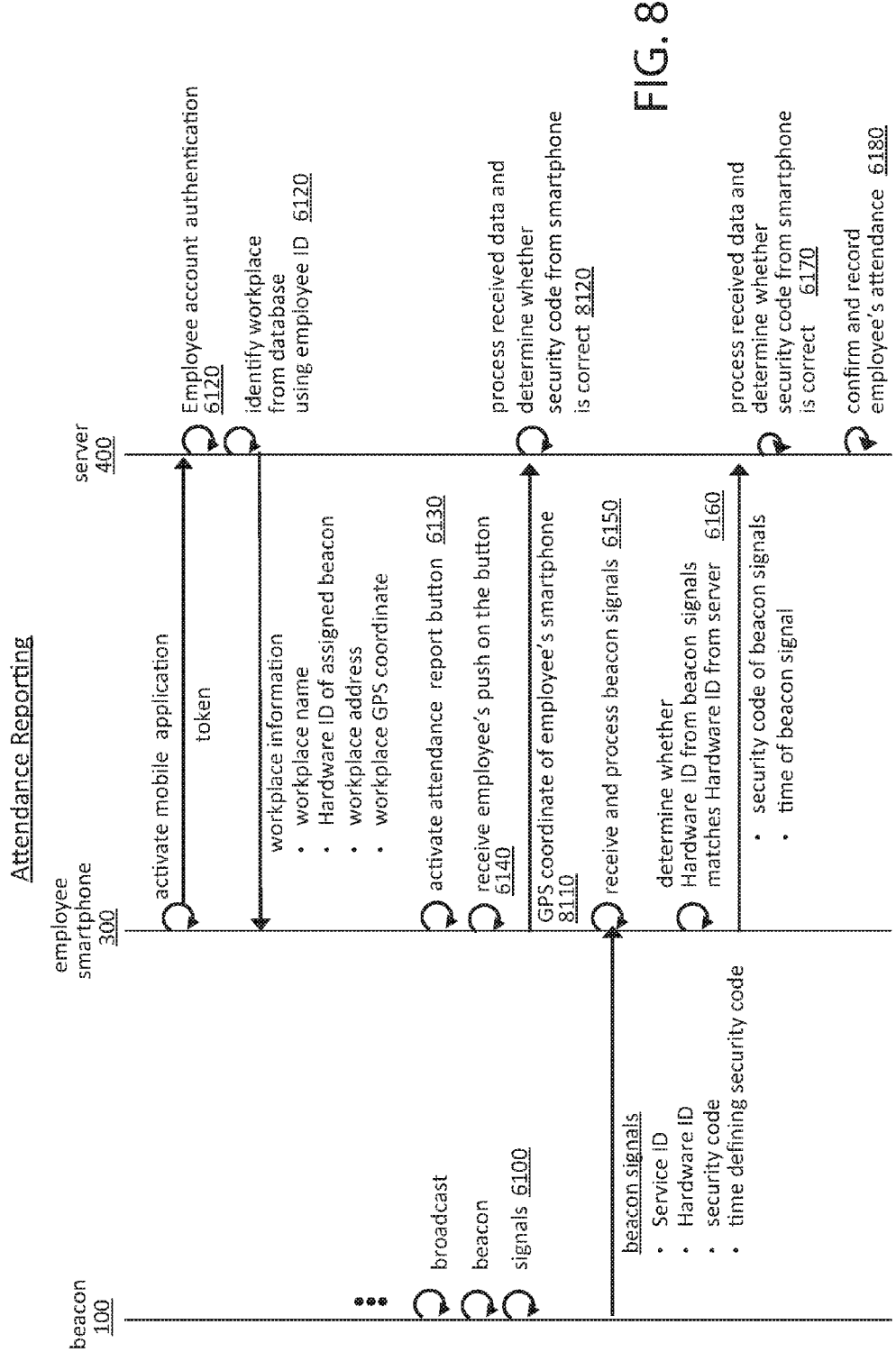
FIG. 8 illustrates a process of recording attendance of an employee in another embodiment of the present invention.

Referring to FIG. 8, in embodiments, the smartphone's GPS location information (GPS coordinates) can be used for determining the employee's location. If the employee requests attendance recording using the smartphone, the smartphone 300 transmits GPS location information to the server (8110). The server 400 verifies whether the employee is located at the workplace (8120) by determining whether the GPS location information of the smartphone 300 matches a location (GPS coordinates or an address) of the employee's workplace (e.g., whether a distance between the smartphone's location and the workplace's location is not greater than a predetermined distance). In an embodiment, only when the location information of the smartphone matches the location information of the employee's workplace, the server 400 records attendance of the employee in the database (6180). In an embodiment, verification of the GPS position information match (8120) can be performed in the smartphone rather than the server. In some embodiments, if (1) the hardware ID acquired by the smartphone from the beacon signals matches the beacon hardware ID identified from the database using the employee's identification and (2) the smartphone's location matches the location information of the employee's workplace, the server determines that the employee has requested attendance reporting at the workplace and records attendance of the employee in the database 500. In another embodiment, other information that indicating the smartphone's location, such as information of a recently connected wireless communication station and an IP address of the smartphone, can be considered alternatively to or together with the GPS location information.

Analyzing Beacon Signal Profile

Figure 13:
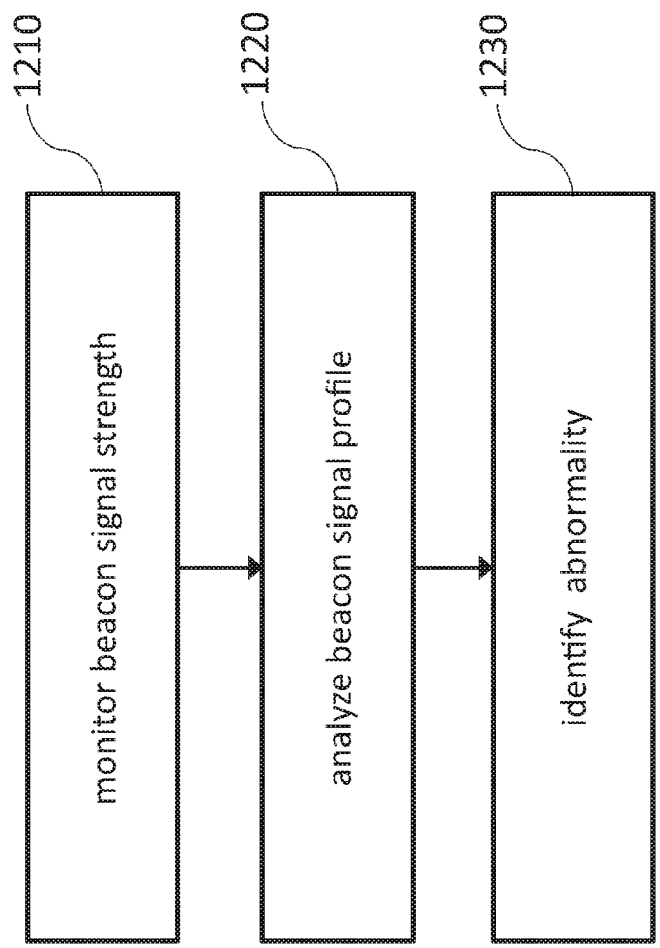
FIG. 13 is a flowchart of analyzing beacon signal strength for detecting abnormal activities according to an embodiment of the present invention.
Figure 14:
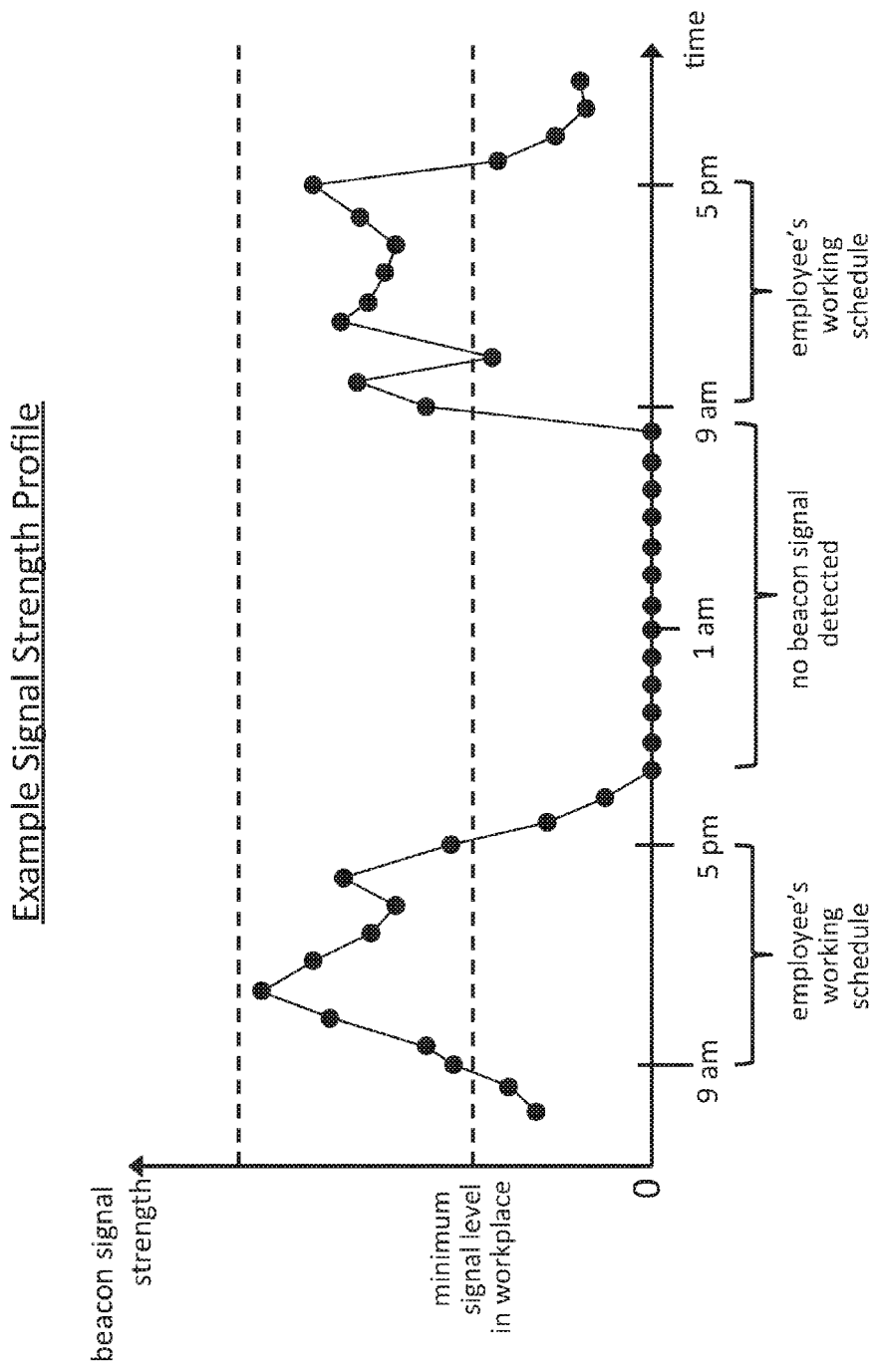
FIG. 14 illustrates a normal profile of the beacon signal strength received at the smartphone.
Figure 15:
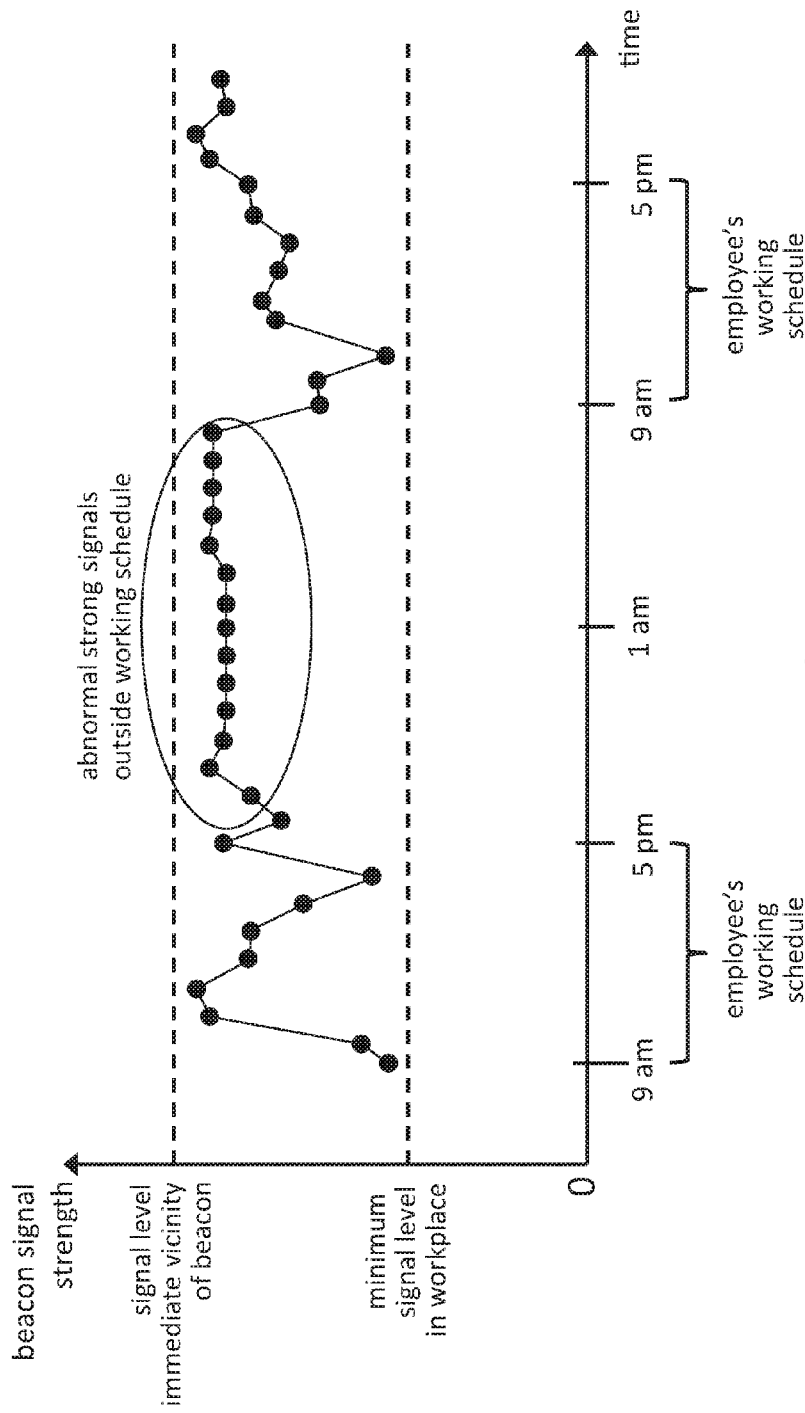
FIG. 15 illustrates an abnormal profile of the beacon signal strength received at the smartphone.

FIG. 13 illustrates a process of detecting an abnormal pattern of beacon signals according to an embodiment of the present invention. FIGS. 14 and 15 illustrate profiles of beacon signal strength according to an embodiment of the present invention. When a beacon is taken out of a workplace as illustrated in FIG. 3, it may be difficult to detect such abuse by analyzing beacon signals of a limited time period (during a working schedule) because signals of the original beacon will still be received at the smartphone. However, when the strength of beacon signals at the employee's smartphone outside the working schedule is monitored additionally, it may be determined whether the employee records his/her attendance using the beacon taken out of the workplace.

Monitoring Beacon Signal Strength (1210)

In embodiments, the smartphone 300 periodically scans beacon signals and records a Received Signal Strength Indicator (RSSI) of the beacon signals. In an embodiment, even when the mobile application for attendance recording is not activated, the smartphone 300 periodically obtains signals from nearby beacons while running in the background. In an embodiment, the smartphone maintains a signal strength profile only for the signals having the hardware ID of the beacon assigned to the employee's workplace.

Analyzing Beacon Signal Strength Profile (1220)

The signal profile of the beacon assigned to the employee's workplace is analyzed at the server or the smartphone. In an embodiment, a profile containing beacon signal strength outside the employee's working schedule is analyzed at the smartphone 300, and the smartphone 300 provides the analysis result to the server while providing the beacon signal strength profile to the server 400.

Detecting Abnormal Signal Strength (1230)

Since the employee is generally outside the workplace after clocking out (e.g., during sleeping hours), it is not likely for the smartphone to sense to detect signals from the workplace's beacon after clock-out. FIG. 14 illustrates a profile of the beacon signal strength at the smartphone of the employee who clocks in at 9 a.m. and clocks out at 5 p.m. When the employee clocks in at 9 a.m., the beacon signal strength increases beyond a minimum expected signal strength of the workplace. After the employee clocks out at 5 p.m., the beacon signal decreases below the minimum expected signal strength of the workplace. The beacon signal is not detected during the night after 8 p.m. However, when the employee carries the beacon outside the workplace, the beacon signal will be sensed at the smartphone even outside the working schedule as illustrated in FIG. 15. Particularly, if the beacon signal does not fall below the minimum signal strength of the workplace even after the scheduled clock-out of 5 p.m. and maintains the signal strengths that are expected at the workplace, the signal profile is abnormal. In an embodiment, if a beacon signal higher than a reference value is sensed at the smartphone even after a predetermined time from the scheduled clock-out according to the working schedule stored in the database 500, it is determined as an abnormality.

Database

Workplace Information Database

FIG. 9 illustrates information of workplaces recorded in a database according to an embodiment. A unique identifier is assigned to each of the workplaces. A unique identifier of a beacon assigned to a workplace is linked to the unique identifier of the workplace. A unique identifier of an employee working at the workplace is also linked to the unique identifier of each workplace. In an embodiment, information such as a name, an address, GPS coordinate information, business hours of a workplace is linked to the unique identifier of the workplace and stored in the database.

Employee Information Database

FIG. 10 illustrates information of employees recorded in a database according to an embodiment of the present invention. A unique identifier is assigned to each of the employees. In an embodiment, employee's contact information, a smartphone device model, a smartphone serial number, a workplace and a working schedule at the workplace are recorded in the database in connection with the identifier of the employee.

Beacon Information Database

FIG. 11 illustrates information of beacons stored in a database according to an embodiment of the present invention. In connection to an identifier of a beacon, information such as a workplace wherer the beacon is installed, an initialization or installation date of the beacon, a firmware version of the beacon, a pin code for updating the beacon, a beacon data transmission period, a beacon security code updating period may be recorded in the database.

Attendance Log Database

FIG. 12 illustrates an attendance log stored in a database according to an embodiment of the present invention. The attendance log includes information regarding clock-in and clock-out of employees. For example, information such as a time when an employee reported workplace check-in (Clock-in time), an identifier of a smartphone used for check-in reporting (Clock-in smartphone ID), an identifier of a beacon of which signal is sensed by the smartphone at the time of check-in reporting (Clock-Beacon ID) can be recorded in the database in connection with the identifier of the employee and the identifier of the workplace.

Configuration of Server

FIG. 16 illustrates configuration of a server according to an embodiment. The server 400 includes one or more processors 1510, a memory configured to store software executable by the processors, and a communication interface for communicating with other devices. The server 400 implements features of the attendance recording system based on execution of software modules. Referring to FIG. 16, the server has software modules such as a token generation module, an authentication module, a hardware ID verification module, a security code verification module, an attendance event log management module, and an abnormal phenomenon detection module.

User Interface

Figure 17A:
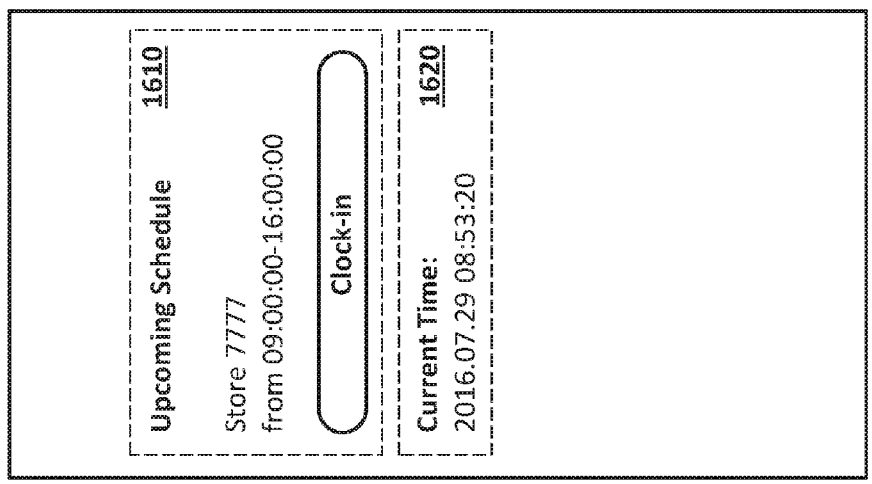
FIGS. 17A to 17D illustrates user interfaces of a mobile application installed in the smartphone of FIG. 1.
Figure 17B:
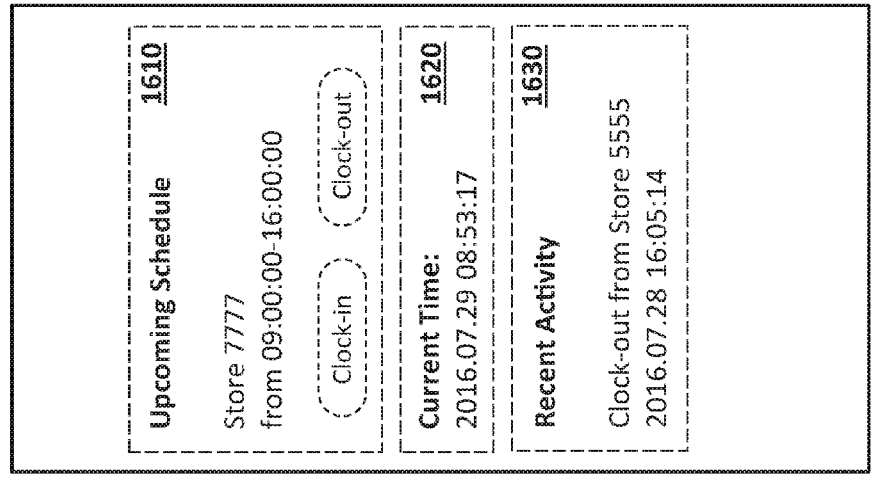
Figure 17D:
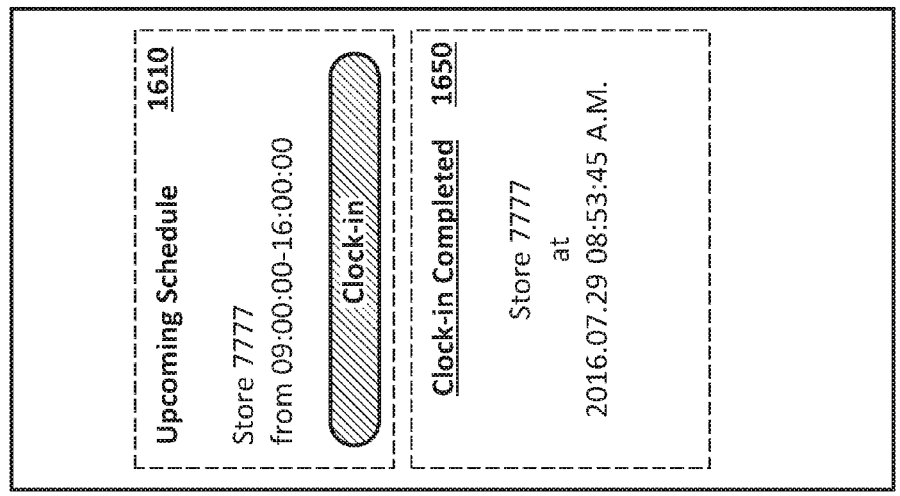
Figure 17C:
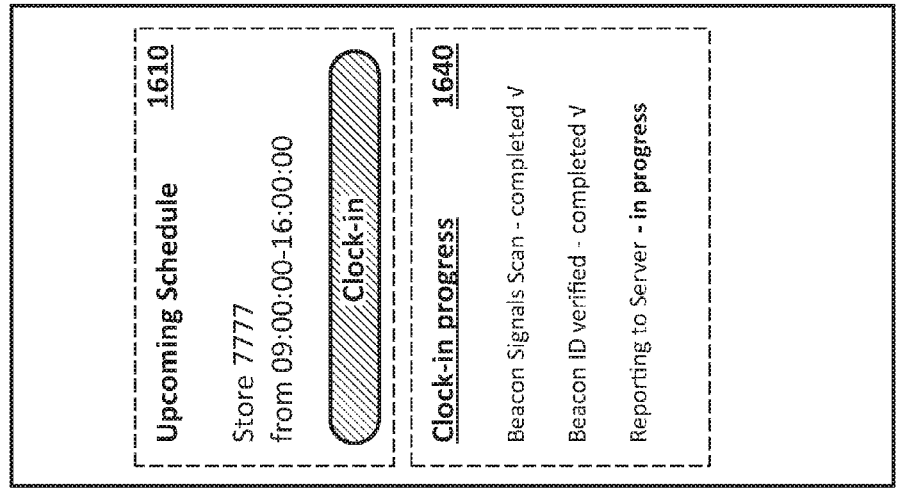

FIG. 17A illustrates an interface displayed on the smartphone 300 after authentication for an employee is completed. The smartphone displays an upcoming working schedule 1610 of the authenticated employee, a current time 1620, and an attendance event 1630. A clock-in button and a clock-out button are displayed in association with the working schedule 1610. FIG. 17B illustrates activation of the clock-in button. FIG. 17C illustrates display of attendance reporting progress 1640 in response to the selection of the clock-in button. FIG. 17D illustrates a message 1650 that clock-in of the employee is confirmed.

Transmission Period of Beacon Data

In embodiments, a beacon periodically transmits at least one of the attendance service ID, the hardware ID of the beacon, the security code and the key of the security code. The data transmission period can be, for example, one selected among a half second, one second, two seconds, three seconds, five seconds, ten seconds and one minute. In an embodiment, the data transmission period of the beacon is longer than the time period allowed for beacon signals collection (time-out) by the smartphone in response to the employee's selection of the attendance recording request button. For example, if the smartphone collects beacon signals only for three seconds as the employee selects the attendance recording request button, the beacon is set to transmit its data at least one time during the allowed three seconds. In other embodiments, the data transmission period of the beacon is adjusted to generate wireless signals more frequently during a business opening time period (or a business closing time frame) of the workplace, when compared to the other time periods. For example, when the business opening of workplace A is 9 a.m., a beacon installed at the workplace A may transmit its data more frequently during a time period starting 9:30 a.m. than a time period ending 9:30 a.m. (for example, from 8:30 a.m. until 9:30 a.m.).

Attendance Includes Clock-in and Clock-Out

In embodiments, attendance means clock-in and clock-out of an employee. In this application, procedures of recording clock-in of an employee and their description can be applied for procedures of recording clock-out.

Duplicated Beacon Signals

In embodiments, the server or the smartphone examine whether a beacon signal collected at the smartphone for employee attendance reporting is duplicated to a previously collected beacon signal having the same hardware ID, and may not approve the attendance reporting based on the examination. For example, if two beacon signals having the same hardware ID collected with a time difference (one hour) longer than a time period of security code updating (e.g., fifteen minutes) have the same security code, it may be determined as an indication of potential abuse. For example, in a case where a beacon installed in a workplace updates the security code every one hour, if a beacon signal collected on July 29 and another beacon signal collected after a day have the same hardware ID and the same security code, it is a basis of rejecting the attendance recording (or a basis of determining an abuse).

Attendance Recording Based on Smartphone ID Match

In embodiments, when the employee activates the mobile application in the smartphone 300, the identifier of the smartphone is transmitted to the server. The server 400 determines whether the transferred identifier of the smartphone matches the identifier of the smartphone linked to the employee in the database. In some embodiments, the server may record attendance of the employee only when matching between the smartphone identifiers is verified. In some embodiments, if the identifier of the smartphone transferred to the server does not match the identifier recorded in the database, the server may not approve an attendance recording request of the employee, notify mismatch of the identifier to the manager of the store, or transmit a request to register a new smartphone to the employee.

Combination of Multiple Criteria for Attendance Recording

In an embodiment, the attendance recording system may approve employee's attendance recording request or determine a potential abuse by considering at least one of the following criteria including (1) whether the hardware ID acquired from the beacon signals at the smartphone matches the hardware ID identified from the database using the employee's identifier, (2) whether the security code acquired from the beacon signals matches the security code generated at the server, (3) whether location of the smartphone matches location of the employee's workplace (within a predetermined range), (4) whether the beacon signal currently acquired for attendance reporting is duplicated to another beacon signal previously used for attendance reporting of the same employee, and (5) whether the employee uses different smartphones for attendance reporting.

What is claimed is:

1. A method of processing attendance reporting, the method comprising:
    providing at least one beacon for installing at a designated facility for an attendance reporting service such that a first beacon is installed at a first facility for the attendance reporting service, each beacon being configured to broadcast wireless signals such that the wireless signals can be received by at least one mobile terminal located within the facility where the beacon is installed, the wireless signals carrying a service ID and a hardware ID, the service ID being pre-assigned to and indicative of an attendance reporting service, the hardware ID being pre-assigned and specific to hardware of the first beacon;
    providing at least one database comprising data identifying users and facilities and further comprising hardware IDs of beacons such that, in the at least one database a first user working at a first facility is linked to the first facility and a first beacon installed in the first facility is linked to the first facility;
    providing a mobile application for installation on mobile terminals and for operation of the attendance reporting service such that the mobile application is installed on a first mobile terminal;
    providing a server comprising at least one computing device capable of accessing the at least one database and capable of communicating with mobile terminals;
    subsequent to installation of the first beacon at the first facility and further subsequent to installation of the mobile application on the first mobile terminal, authenticating, by the server, the first user for reporting attendance via the mobile application installed on the first mobile terminal;
    subsequent to authentication of the first user, finding the first beacon, the first facility or both in the at least one database using data identifying the first user based on that in the at least one database the first beacon is linked to the first facility and the first facility is linked to the first user, wherein a particular hardware ID of the first beacon is identified by finding the first beacon, the first facility or both identifies;
    in response to the first user's command for reporting attendance on the mobile application, causing to process wireless signals received by the first mobile terminal to identify the wireless signals broadcast by a beacon associated with the attendance reporting service and further to acquire the hardware ID contained in the identified wireless signals;
    subsequent to finding the first beacon, the first facility or both in the at least one database and further subsequent to acquiring the hardware ID, comparing the acquired hardware ID against the particular hardware ID of the first beacon found in the at least one database using the data identifying the first user;
    subsequent to determining that the acquired hardware ID is that of the first beacon, monitoring signal strength of the wireless signals broadcast by the first beacon; and
    processing a signal strength profile of the wireless signals broadcast by the first beacon over time to determine a predetermined pattern of abnormality indicating a potential abuse in attendance reporting, wherein in the predetermined pattern, the signal strength stays stronger than a reference level in a time frame at which the first user is not expected to be at the first facility.

2. The method of claim 1, wherein causing to process wireless signals received by the first mobile terminal to identify the wireless signals comprises determining if the received wireless signals broadcast by a beacon contains the service ID that is pre-assigned to and indicative of the attendance reporting service.

3. The method of claim 1, wherein the mobile application installed on the first mobile terminal contains the service ID for the attendance reporting service, wherein determining comprises checking to see if the service ID contained in the mobile application matches data contained in the wireless signals that the first mobile terminal has received, wherein acquiring the hardware ID from the identified wireless signals is performed in parallel or in an order with a time gap between two consecutive acquisitions such that one or more steps of operation intervene between the two consecutive acquisitions.

4. The method of claim 1, wherein the first user's command for reporting attendance at the first facility occurs prior to authenticating the first user, wherein identifying the wireless signals broadcast by a beacon associated with the attendance reporting service is performed by the first mobile terminal alone, by the server alone or by the first mobile terminal and the server in combination.

5. The method of claim 1, wherein the first user's command for reporting attendance occurs subsequent to authenticating the first user and further subsequent to finding the first beacon, the first facility or both in the at least one database, wherein acquiring the hardware ID contained in the identified wireless signals is performed by the first mobile terminal alone, by the server alone or by the first mobile terminal and the server in combination.

6. The method of claim 1, wherein the first mobile terminal processes the identified wireless signals to acquire the hardware ID and transmits the hardware ID to the server, wherein the server determines if the hardware ID from the first mobile terminal matches the hardware ID of the first beacon found in the at least one database using the data identifying the first user.

7. The method of claim 1, wherein subsequent to the first user's command for reporting attendance occurs subsequent to authenticating the first user and further subsequent to finding the first beacon, the first facility or both in the at least one database.

8. The method of claim 7, wherein subsequent to finding the first beacon, the first facility or both in the at least one database, the server communicates with the first mobile terminal to cause the mobile application of the first mobile terminal to provide a prompt or button for the first user to make the command for reporting attendance.

9. The method of claim 7, wherein the first user is linked to a second facility that is linked to a second beacon of the at least one beacon, wherein subsequent to authentication of the first user, the server further finds the second beacon, the second facility or both in the at least one database using the data identifying the first user, wherein subsequent to finding, the server transmits data to the first mobile terminal to cause the mobile application to provide a prompt for choosing between the first facility and the second facility prior to making the command for reporting attendance.

10. The method of claim 7, wherein subsequent to finding the second beacon, the second facility or both in addition to finding the first beacon, the first facility or both, the server, the mobile application or both in combination processes to determine which of the first and second facilities is the one the first user is more likely to be based on one or more selected from the group consisting of day of the week, time of the day, GPS information from the first mobile terminal and the first user's schedule stored in the at least one database, wherein upon determination, the mobile application presents the more likely option between the first and second facilities to select more conveniently than the less likely option between the first and second facilities.

11. The method of claim 7, wherein finding the first beacon, the first facility or both in the at least one database is performed by the server, wherein subsequent to finding, the server transmits the hardware ID of the first beacon to the first mobile terminal, which causes the mobile application to provide a prompt or button for the first user to make the command for reporting attendance.

12. The method of claim 11, wherein in response to the first user's command for reporting attendance, the mobile application determines if the hardware ID acquired from the wireless signals matches the hardware ID of the first beacon received from the server.

13. The method of claim 1, wherein the wireless signals further carry a security code and a security key, the security code being time-variant and generated by an algorithm included in each beacon, the security key being a key for the security code such that the same algorithm can generate the identical security code when using the security key, wherein the method further comprises:

in response to the first user's command for reporting attendance on the mobile application, causing to process wireless signals received by the first mobile terminal to acquire the security code and the security key contained in the identified wireless signals;

subsequent to acquiring the security code and the security key, determining if the acquired security code is the one expected from the first beacon using the acquired security key and an algorithm corresponding to the one included in the first beacon for generating the security code; and recording, in the at least one database, the first user's attendance at the first facility in response to the first user's command for reporting attendance when it is determined that the acquired hardware ID is that of the first beacon and further that the acquired security code is the one expected from the first beacon.

14. The method of claim 13, wherein acquiring the security code and the security key from the identified wireless signals is performed in parallel or in an order with a time gap between two consecutive acquisitions such that one or more steps of operation intervene between the two consecutive acquisitions.

15. A method of processing attendance reporting, the method comprising:

providing at least one beacon for installing at a designated facility for an attendance reporting service such that a first beacon is installed at a first facility for the attendance reporting service, each beacon being configured to broadcast wireless signals such that the wireless signals can be received by at least one mobile terminal located within the facility where the beacon is installed, the wireless signals carrying a service ID and a hardware ID, the service ID being pre-assigned to and indicative of an attendance reporting service, the hardware ID being me-assigned and specific to hardware of the first beacon;

providing at east one database comprising data identifying users and facilities and further comprising hardware IDs of beacons such that, in the at least one database a first user working at a facility is linked to the first facility and a first beacon installed in the first facility is linked to the first facility;

providing a mobile application for installation on mobile terminals and for operation of the attendance reporting service such that the mobile application is installed on a first mobile terminal;

providing a server comprising least one computing device capable of accessing the at least one database and capable of communicating with mobile terminals;

subsequent to installation of the first beacon at the first facility and further subsequent to installation of the mobile application on the first mobile terminal, authenticating, by the server, the first user for reporting attendance via the mobile application installed on the first mobile terminal;

subsequent to authentication of the first user, finding the first beacon, the first facility or both in the at least one database using data identifying the first user based on that in the at least one database the first beacon is linked to the first facility and the first facility is linked to the first user, wherein a particular hardware ID of the first beacon is identified by finding the first beacon, the first facility or both identifies;

in response to the first user's command for reporting attendance on the mobile application causing to process wireless signals received by the first mobile terminal to identify the wireless signals broadcast by a beacon associated with the attendance reporting service and further to acquire the hardware ID contained in the identified wireless signals;

subsequent to finding the first beacon, the first facility or both in the at least one database and further subsequent to acquiring the hardware ID, determining if the acquired hardware ID is the particular hardware ID of the first beacon found the at least one database using the data identifying the first user;

subsequent to determining that the acquired hardware ID is that of the first beacon, monitoring signal strength of the wireless signals broadcast by the first beacon; and processing a signal strength profile of the wireless signals broadcast by the first beacon over time to determine a predetermined pattern of abnormality indicating a potential abuse in attendance reporting, wherein in the predetermined pattern, the signal strength stays stronger than a reference level and substantially constant in a time frame at which the first user is not expected to be at the first facility.

16. A method of processing attendance reporting, the method comprising:

providing at least one beacon for installing at a designated facility for an attendance reporting service such that a first beacon is installed at a first facility for the attendance reporting service, each beacon being configured to broadcast wireless signals such that the wireless signals can be received by at least one mobile terminal located within the facility where the beacon is installed, the wireless signals carrying a hardware ID, pre-assigned and specific to hardware of the first beacon, providing at least one database comprising data identifying users and facilities and further comprising hardware IDs of beacons such that, in the at least one database a first user working at a first facility is linked to the first facility and a first beacon installed in the first facility is linked to the first facility;

providing a mobile application for installation on mobile terminals and for operation of the attendance reporting service such that the mobile application is installed on a first mobile terminal;

providing a server comprising at least one computing device capable of accessing the at least one database and capable of communicating with mobile terminals;

subsequent to installation of the first beacon at the first facility and further subsequent to installation of the mobile application on the first mobile terminal, processing wireless signals received by the first mobile terminal to acquire the hardware ID contained in the wireless signals;

subsequent to acquiring the hardware ID, determining if the acquired hardware ID is a particular hardware ID of the first beacon using data of the at least one database;

subsequent to determining that the acquired hardware ID is that of the first beacon, monitoring signal strength of the wireless signals broadcast by the first beacon; and processing a signal strength profile of the wireless signals broadcast by the first beacon over time to determine a predetermined pattern of abnormality indicating a potential abuse in attendance reporting, wherein in the Predetermined pattern, the signal strength stays stronger than a reference level in a time frame at which the first user is not expected to be at the first facility.

17. The method of claim 16, further comprising:

subsequent to installation of the first beacon at the first facility and further subsequent to installation of the mobile application on the first mobile terminal, authenticating, by the server, the first user for reporting attendance via the mobile application installed on the first mobile terminal.

18. The method of claim 16, further comprising:

subsequent to authentication of the first user, finding the first beacon, the first facility or both in the at least one database using data identifying the first user based on that in the at least one database the first beacon is linked to the first facility and the first facility is linked to the first user, wherein finding the first beacon, the first facility or bot leads to identify the particular hardware ID of the first beacon, wherein determining if the acquired hardware ID is the particular hardware ID of the first beacon comprises comparing the acquired hardware ID against the identified particular hardware ID of the first beacon.

19. The method of claim 16, further comprising:

in response to the first user's command for reporting attendance on the mobile application, causing to process wireless signals received by the first mobile terminal to identify the wireless signals broadcast by a beacon associated with the attendance reporting service, wherein acquiring the hardware ID is also performed in response to the first user's command for reporting attendance on the mobile application.

20. The method of claim 16, wherein the wireless signals further carry a security code and a security key, the security code being time-variant and generated by an algorithm included in each beacon, the security key being a key for the security code such that the same algorithm can generate the identical security code when using the security key, wherein the method further comprises:

in response to the first user's command for reporting attendance on the mobile application, causing to process wireless signals received by the first mobile terminal to acquire the security code and the security key contained in the identified wireless signals.

21. The method of claim 20, further comprising:

subsequent to acquiring the security code and the security key, determining if the acquired security code is the one expected from the first beacon using the acquired security key and an algorithm corresponding to the one included in the first beacon for generating the security code.

22. The method of claim 21, further comprising:

recording, in the at least one database, the first user's attendance at the first facility in response to the first user's command for reporting attendance when it is determined that the acquired hardware ID is that of the first beacon and further that the acquired security code is the one expected from the first beacon.

23. The method of claim 16, further comprising:

in response to the first user's command for reporting attendance on the mobile application, causing to process wireless signals received by the first mobile terminal to identify the wireless signals broadcast by a beacon associated with the attendance reporting service, wherein the wireless signals from the first beacon further carry a service ID pre-assigned to and indicative of the attendance reporting service, wherein causing to process wireless signals received by the first mobile terminal to identify the wireless signals comprises determining if the received wireless signals broadcast by a beacon contains the service ID that is pre-assigned to and indicative of the attendance reporting service.

24. The method of claim 23, wherein the mobile application installed on the first mobile terminal contains the service ID for the attendance reporting service, wherein determining comprises checking to see if the service ID contained in the mobile application matches data contained in the wireless signals that the first mobile terminal has received, wherein acquiring the hardware ID, the security code and the security key from the identified wireless signals is performed in parallel or in an order with a time gap between two consecutive acquisitions such that one or more steps of operation intervene between the two consecutive acquisitions.

25. The method of claim 23, wherein the first user's command for reporting attendance at the first facility occurs prior to authenticating the first user, wherein identifying the wireless signals broadcast by a beacon associated with the attendance reporting service is performed by the first mobile terminal alone, by the server alone or by the first mobile terminal and the server in combination.

26. The method of claim 20, wherein the first user's command for reporting attendance occurs subsequent to authenticating the first user and further subsequent to finding the first beacon, the first facility or both in the at least one database, wherein acquiring the hardware ID, the security code and the security key contained in the identified wireless signals is performed by the first mobile terminal alone, by the server alone or by the first mobile terminal and the server in combination.

27. The method of claim 16, wherein the first mobile terminal processes the identified wireless signals to acquire the hardware ID and transmits the hardware ID to the server, wherein the server compares the hardware ID from the first mobile terminal against the hardware ID of the first beacon found in the at least one database using information identifying the first user.

28. The method of claim 18, wherein the first user's command for reporting attendance occurs subsequent to authenticating the first user and further subsequent to finding the first beacon, the first facility or both in the at least one database.

29. The method of claim 18, wherein subsequent to finding the first beacon, the first facility or both in the at least one database, the server communicates with the first mobile terminal to cause the mobile application of the first mobile terminal to provide a prompt or button for the first user to make the command for reporting attendance.

30. The method of claim 18, wherein the first user is linked to a second facility that is liked to a second beacon of the at least one beacon, wherein subsequent to authentication of the first user, the server further finds the second beacon, the second facility or both in the at least one database using the data identifying the first user, wherein subsequent to finding, the server transmits data to the first mobile terminal to cause the mobile application to provide a prompt for choosing between the first facility and the second facility prior to making the command for reporting attendance.

* * * * *